United States Patent [19]

Tomm et al.

[11] Patent Number: 4,616,744
[45] Date of Patent: Oct. 14, 1986

[54] FRICTION CLUTCH UNIT WITH A STOP ELEMENT FOR LIMITING PRESSER PLATE TRAVEL

[75] Inventors: Dagwin Tomm, Kaiserslautern; Dieter Kolb, Bad Kissingen; Siegmund Gehrig, Arnstein-Binsfeld; Alfred Meyer, Schweinfurt, all of Fed. Rep. of Germany

[73] Assignee: Fichtel & Sachs AG, Schweinfurt, Fed. Rep. of Germany

[21] Appl. No.: 691,270

[22] Filed: Jan. 14, 1985

[30] Foreign Application Priority Data

Jan. 17, 1984 [DE] Fed. Rep. of Germany ....... 3401366

[51] Int. Cl.$^4$ ...................... F16D 13/69; F16D 13/71
[52] U.S. Cl. ............................ 192/109 R; 192/70.28
[58] Field of Search ............. 192/70.18, 70.28, 109 R, 192/70.19, 70.13, 70.27, 89 B, 98, 99 A

[56] References Cited

U.S. PATENT DOCUMENTS 4,122,929  10/1978  Maucher et al. ................. 192/70.18
4,368,810   1/1983  Maucher et al. ................. 192/70.28
4,531,622   7/1985  Bacher et al. ................... 192/70.18

FOREIGN PATENT DOCUMENTS 2841763  4/1980  Fed. Rep. of Germany .
2102085  1/1983  United Kingdom .

Primary Examiner—George H. Krizmanich

Attorney, Agent, or Firm—Toren, McGeady, Stanger, Goldberg & Kiel

[57] ABSTRACT

In a friction clutch unit the axial travel of the presser plate with respect to the clutch housing is axially limited. The presser plate is connected for common rotation with the clutch housing by a plurality of tangential leaf spring elements. These leaf spring elements allow axial travel of the presser plate with respect to the clutch housing, when the clutch housing is separated from the respective driving disc. A main spring is provided which is supported on the clutch housing and acts onto the presser plate. This main spring urges the presser plate away from the clutch housing. In order to restrict the travel of the presser plate under the action of the main spring stop elements are provided axially between the spring elements and the clutch housing and tangentially between the two ends of the respective leaf spring elements, namely nearer to that end of the respective leaf spring element which is fixed to the clutch housing. In assembling the friction clutch one can preassemble the presser plate with the leaf springs and thereafter insert the presser plate with the leaf springs into the clutch housing. Hereupon the free ends of the leaf springs are fixed to the clutch housing. The insertion of the presser plate with the leaf springs into the clutch housing requires only an axial movement of the presser plate with respect to the clutch housing along the common axis of the clutch housing and the presser plate.

4 Claims, 4 Drawing Figures

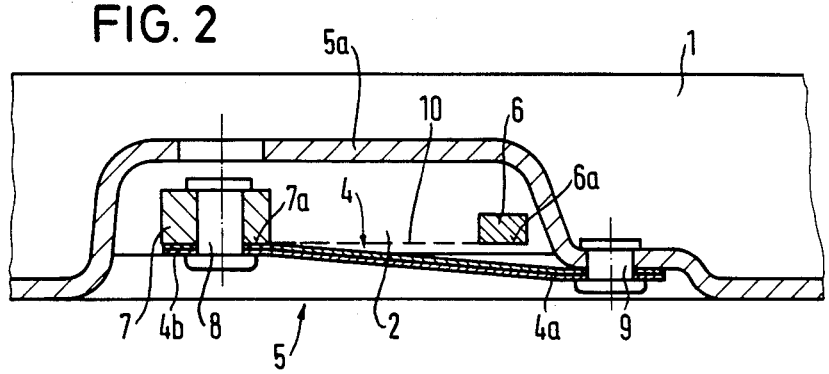
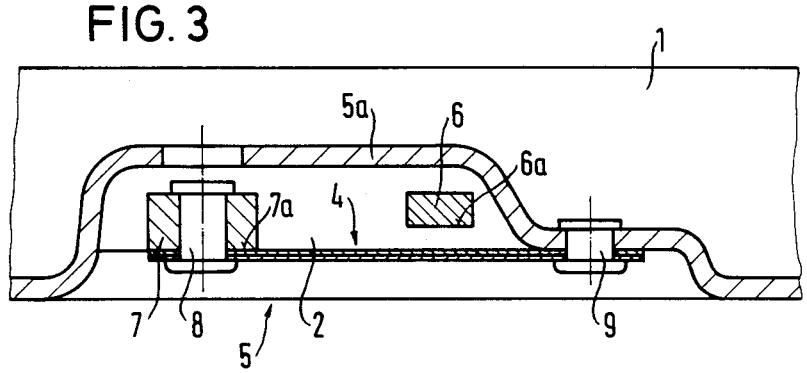
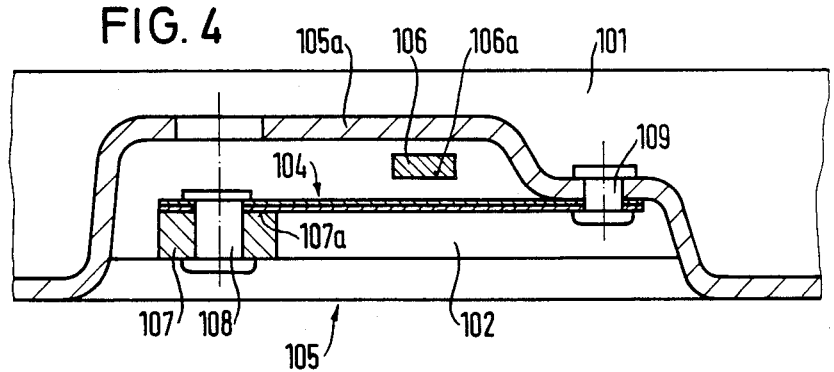

FRICTION CLUTCH UNIT WITH A STOP ELEMENT FOR LIMITING PRESSER PLATE TRAVEL

BACKGROUND OF THE INVENTION

This invention relates to a friction clutch unit such as for motor vehicles. Such a friction clutch unit comprises a clutch housing which is to be fixed to a driving disc. A presser plate is connected to the clutch housing for common rotation therewith. For connecting the presser plate to the clutch housing a plurality of tangential leaf spring elements are provided. These leaf spring elements allow axial travel of the presser plate with respect to the clutch housing. The friction clutch unit further comprises a main spring which is to press the presser plate against a clutch disc and the clutch disc against the driving disc such as to frictionally engage the clutch disc between the driving disc and the presser plate in order to transmit a torque between the clutch disc and the driving disc. Before the clutch housing is fixed to the driving disc the clutch housing is already preassembled with the presser plate and the main spring. It is therefore necessary to provide travel-limiting means which limit the travel of the presser plate in axial direction under the action of the main spring such as to be tolerable for the leaf spring elements.

STATEMENT OF THE PRIOR ART

In German Offenlegungsschrift No. 2 841 763 the travel-limiting means comprise stop elements which project in circumferential direction from the clutch housing. These stop elements are axially aligned with projections of the presser plate on that side thereof which is nearer to the driving disc. The projections are used for fixing the leaf spring elements to the presser plate. When preassembling the clutch housing with the presser plate one can preassemble the leaf spring elements either with the clutch housing or with the presser plate. In each case it is, however, necessary for inserting the presser plate into the clutch housing to first approach the presser plate in axial direction towards the clutch housing and then to rotate the presser plate with respect to the clutch housing. Only after this complex insertion movement the still lacking fixation can be accomplished.

OBJECT OF THE INVENTION

It is a primary object of this invention to provide travel limiting means in a friction clutch unit of the type as described above which permit easier assembling of the clutch housing, the presser plate, the leaf spring element and the main spring.

A further object of the invention is to provide a clutch unit which is more adapted for automatic manufacturing than known clutch units.

A further object of the invention is to reduce manufacturing costs of a clutch unit.

SUMMARY OF THE INVENTION

In view of the above-mentioned objects of the invention a friction clutch unit such as for motor vehicles comprises a clutch housing having an axis and adapted for being fixed to a driving disc. A presser plate is connected to the clutch housing for common rotation therewith about said axis and for limited axial movement with respect to said clutch housing. Main spring means are supported by the clutch housing and engage the presser plate such as to urge the presser plate towards a clutch disc and said clutch disc towards a friction face of the driving disc. The presser plate is connected to the clutch housing by a plurality of leaf spring elements which are substantially tangential with respect to the axis and are fixed by a first respective end to the clutch housing and by a second respective end to the presser plate. Travel-limiting means are provided for limiting the axial travel of the presser plate away from the clutch housing under the action of gravitational force or the action of the main spring means. These travel-limiting means comprise at least one stop element fixed to the presser plate and located axially on the side of at least one of said leaf spring elements remote from the driving disc and in tangential direction between the first and second end of the respective leaf spring element. The stop element is axially spaced from the respective leaf spring element in operation of the clutch and abuts the leaf spring element on axial travel of the presser plate away from the clutch housing when the clutch housing is separated from the driving disc.

The friction clutch unit of this invention can be easily assembled such as a friction clutch unit without travel-limiting means can be assembled. One can preassemble the leaf spring elements either with the clutch housing or with the presser plate and hereupon approach the presser plate to the clutch housing along an axial assembling path without the necessity of rotating the presser plate with respect to the clutch housing.

The various featues of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated preferred embodiments of the invention.

BRIEF DESCRIPTION OF THE DRAWINGS

The invention will be explained in greater detail below by reference to examples of embodiment. In detail:

FIG. 2 shows a detail of FIG. 1 as regarded in the direction of arrow II of FIG. 1;

FIG. 3 shows a modified embodiment in a view similar to that of FIG. 2 and

FIG. 4 shows a further modified embodiment in a view similar to FIG. 2.

DETAIL DESCRIPTION OF THE DRAWING

Figure 1:
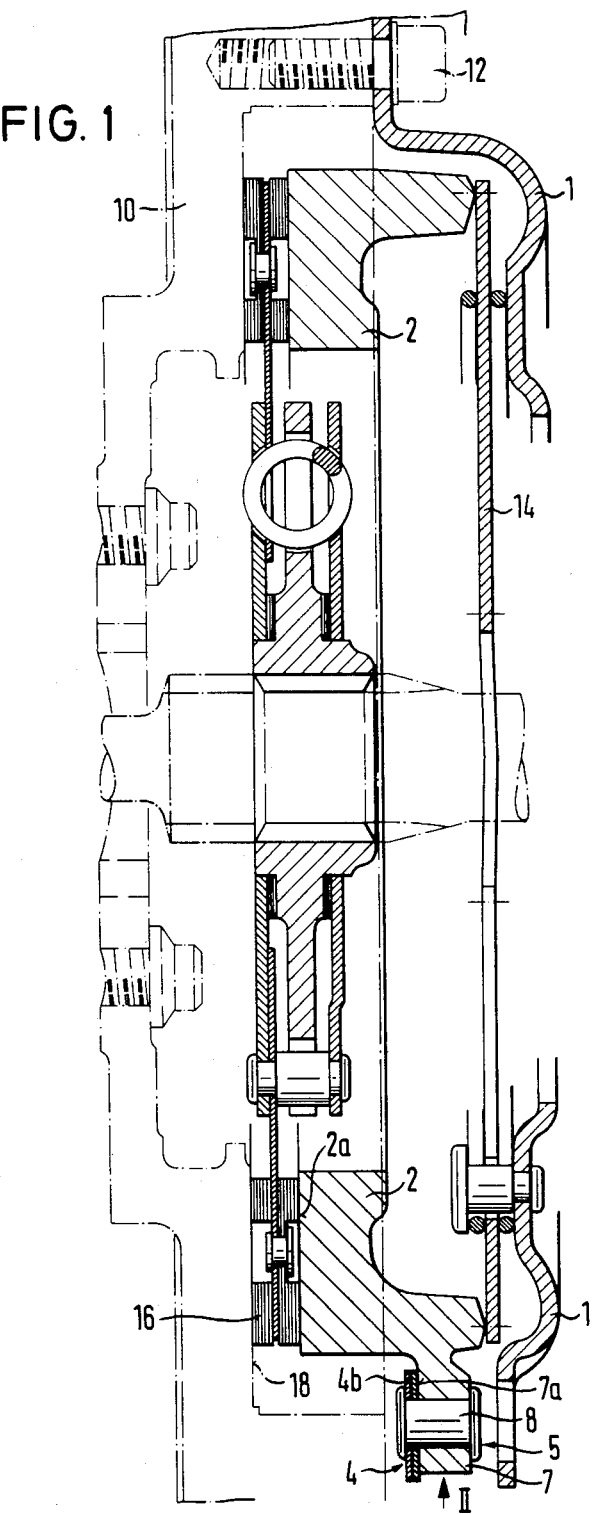
FIG. 1 shows a longitudinal section through a friction clutch unit of this invention with the plane of section containing the axis of the clutch unit.

In FIG. 1 a driving disc shown in dotted lines is designated by 10. A clutch housing 1 is fixed to said driving disc by bolts 12. A presser plate 2 is connected to the clutch housing 1 by a plurality of leaf spring elements 4 which are arranged in tangential direction with respect to the axis of the clutch unit. These leaf spring elements 4 have a first end 4a fixed to the clutch housing by rivets 9 and a second end 4b fixed to a radial projection 7 of the presser plate 2 by a rivet 8. A main spring 14 is supported by the clutch housing 1 and urges the presser plate 2 in axial direction towards a clutch disc unit 16 such as to frictionally engage this clutch disc unit 16 with a friction face 18 of the driving disc 10.

The projections 7 are integrally cast with the presser plate 2.

The leaf spring elements 4 are housed within chambers 5 defined by the clutch housing 1.

The presser plate 2 is provided with a dog 6 which is shown in FIG. 2. This dog is situated axially between the leaf spring elements 4 on the one side and the wall 5a of the chamber 5 on the other side. It is to be noted that the dog 6 is on the side of the leaf spring elements 4, which is remote from the friction face 18 of the driving disc 10. It is further to be noted that the dog 6 is provided with an abutment surface 6a which is located in a common plane 10 which also contains a fixing surface 7a of the radial projection 7 to which the leaf spring elements 4 are fixed by the rivets 8.

FIG. 2 shows the axial position of the projection 7 and the dog 6 with respect to the clutch housing 1 in the operational condition when the clutch housing 1 is fixed to the driving disc 10 as shown in FIG. 1. Before the clutch housing 1 is fixed to the driving disc 10 or after the clutch housing 1 has been separated from the driving disc 10 the main spring 14 urges the presser plate 2 to the left as seen in FIG. 1. Thereby, as seen in FIG. 2, the projection 7 and the dog 6 move downward with respect to the wall 5a. On such downward movement of the projection 7 and the dog 6 in FIG. 2 the right-hand end portion 4a of the leaf spring elements 4 is only moved through a short path of axial movement as compared with the axial movement of the presser plate and, more particularly, the projection 7 thereof. Therefore, the dog 6 abuts by its abutment face 6a against the leaf spring elements 4. Such travel of the presser plate 2 is limited by the cooperation of the dog 6 and the leaf spring elements 4.

It is to be noted that the dog 6 is nearer to the right-hand end portion 4a of the leaf spring element which is fixed to the clutch housing 1 than to the left-hand end portion 4b which is fixed to the projection 7. This proximity of the dog 6 to the right-hand end portion 4a is highly desirable, in view of limiting the axial travel of the presser plate 2.

In the slightly modified embodiment of FIG. 3 the leaf spring elements 4 are located approximately in a plane which corresponds to the friction surface 2a of the presser plate 2. In this embodiment the abutment face 6a is slightly offset against the fixing face 7a. The advantage of the embodiment of FIG. 2 is that the abutment face 6a and the fixing face 7a can be machined in one operation.

In the embodiment of FIG. 4 analogous parts are designated with the same reference numerals as in FIGS. 2 and 3 increased by 100.

In the embodiment of FIG. 4 the leaf spring elements 104 are fixed to a fixing surface 107a which is remote from the driving disc 10 as seen in FIG. 1. Also in FIG. 4 the axial travel of the presser plate 102 is axially limited by the engagement of the dog 106 with the leaf spring elements 104. The embodiment of FIG. 4 requires a larger axial height of the chamber 105.

In all embodiments the assembling of the clutch housing 1 and the presser plate 2 with the projection 7 and the dog 6 requires only an axial movement of approach between the clutch housing 1 and the presser plate 2, irrespectively whether the leaf spring element 4 has been preassembled with the projection 7 or with the clutch housing 1. After the presser plate has been brought in the just position with respect to the clutch housing 1 by axial movement, the leaf spring elements 4 are riveted to the projection 7 in case they were preassembled with the housing 1 or to the housing 1 in case they were preassembled with the presser plate 2.

The invention therefore includes also a method for manufacturing a clutch disc unit.

While a specific embodiment of the invention has been shown and described in detail to illustrate the application of the inventive principles, it will be understood that the invention may be embodied otherwise without departing from such principles.

It is to be understood that the reference numbers in the claims are only for better understanding and are by no means restrictive.

Generally at least three dogs 6 are distributed along the circumference of the presser plate 2 for engagement with three respective leaf spring elements 4. In practice there may be provided dogs 6 for engagement with all leaf spring elements 4.

What is claimed is:

1. A friction clutch unit such as for motor vehicles, comprising a clutch housing (1) having an axis and adapted for being fixed to a driving disc (10), a presser plate (2) connected to said clutch housing (1) for common rotation therewith about said axis and for limited axial movement with respect to the clutch housing (1), main spring means (14) supported by said clutch housing (1) and engaging said presser plate (2) such as to urge said presser plate (2) towards a clutch disc (16) and said clutch disc (16) towards a friction face (18) of said driving disc (10), said presser plate (2) being connected to said clutch housing (1) by a plurality of leaf spring elements (4) which are substantially tangential with respect to said axis and are fixed by a first respective end (4a) to said clutch housing (1) and by a second respective end (4b) to said presser plate (2), travel limiting means being provided for limiting the axial travel of said presser plate (2) away from said clutch housing (1) under at least one of gravitational force and the action of said main spring means (14), said travel limiting means comprising at least one stop element (6) fixed to said presser plate (2) and located axially on the side of at least one of said leaf spring elements remote from said driving disc (10) and in tangential direction between said first (4a) and second (4b) ends of the respective leaf spring elements (4), said stop element (6) being axially spaced from the respective leaf spring element (4) in operation of the clutch and abutting said leaf spring element (4) on axial travel of said presser plate (2) away from said clutch housing (1) when said clutch housing is separated from said driving disc (10).

2. A friction clutch unit as set forth in claim 1, wherein said stop element (6) is formed by a dog cast to said presser plate (2).

3. A friction clutch unit as set forth in claim 1, said stop element (6) being nearer to said first end (4a) of the respective leaf spring element (4) than to said second end (4b) in said tangential direction.

4. A friction clutch unit as set forth in claim 1, said second end (4b) of said leaf spring element (4) being fixed to a projection (7) of said presser plate (2), said projection (7) having a fixing face (7a) for fixing said second end (4b) of the respective leaf spring element (4) and said stop element (6) having an abutment face (6a) for abutting the respective leaf spring element (4), said fixing face (7a) and said abutment face (6a) being located in one common plane (10) and being machined in one machining operation.

* * * * *